(12) United States Patent
Kelty et al.

(10) Patent No.: US 7,786,704 B2
(45) Date of Patent: *Aug. 31, 2010

(54) SYSTEM FOR BATTERY CHARGING BASED ON COST AND LIFE

(75) Inventors: Kurt R. Kelty, Palo Alto, CA (US); Eugene M. Berdichevsky, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/434,041

(22) Filed: May 1, 2009

(65) Prior Publication Data

US 2009/0216688 A1    Aug. 27, 2009

Related U.S. Application Data

(62) Division of application No. 11/779,837, filed on Jul. 18, 2007.

(51) Int. Cl.
*H02J 7/04* (2006.01)
*H02J 7/16* (2006.01)

(52) U.S. Cl. ........................ 320/155; 320/109

(58) Field of Classification Search .................. None
See application file for complete search history.

(56) References Cited

U.S. PATENT DOCUMENTS

| 5,467,006 | A | 11/1995 | Sims |
| 5,650,710 | A | 7/1997 | Hotta |
| 6,335,610 | B1 | 1/2002 | Winstead |
| 6,545,449 | B2 | 4/2003 | Ueda et al. |
| 7,013,205 | B1 | 3/2006 | Hafner et al. |
| 2004/0074682 | A1 | 4/2004 | Fussey et al. |
| 2004/0164616 | A1 | 8/2004 | Obayashi et al. |

(Continued)

FOREIGN PATENT DOCUMENTS

WO    WO-2009012018 A2    1/2009

OTHER PUBLICATIONS

International Application Serial No. PCT/US2008/067670, Invitation to Pay Additional Fees and Partial Search Report mailed Oct. 23, 2008, 8 pgs.

(Continued)

*Primary Examiner*—Edward Tso
*Assistant Examiner*—Ramy Ramadan
(74) *Attorney, Agent, or Firm*—Patent Law Office of David G. Beck (57) ABSTRACT

One embodiment of the present subject matter includes a system that includes a battery, an electric vehicle, the battery coupled to the electric vehicle to propel the electric vehicle, and a charging circuit to charge the battery. The embodiment includes a charging cost circuit to estimate a charging cost rate and to turn on the charging circuit. The embodiment also includes a timer circuit to provide a time signal to the charging cost circuit. The embodiment is configured such that the charging cost circuit is to turn on the charging circuit during a first time period in which the charging cost rate is below a first threshold until the battery reaches a first energy stored level, and to turn on the charging circuit during a second time period in which the charging cost rate is above the first threshold.

24 Claims, 8 Drawing Sheets

U.S. PATENT DOCUMENTS

| | | |
|---|---|---|
| 2005/0127855 A1 | 6/2005 | Wobben |
| 2005/0237029 A1 | 10/2005 | Takezawa et al. |
| 2008/0136371 A1* | 6/2008 | Sutardja .................... 320/109 |
| 2008/0203973 A1* | 8/2008 | Gale et al. ................. 320/157 |
| 2009/0021218 A1 | 1/2009 | Kelty et al. |

OTHER PUBLICATIONS

"International Application Serial No. PCT/US2008/067670, International Search Report mailed Mar. 25, 2009".

"International Application Serial No. PCT/US2008/067670, Written Opinion mailed Mar. 25, 2009".

* cited by examiner

SYSTEM FOR BATTERY CHARGING BASED ON COST AND LIFE

CROSS REFERENCE TO RELATED APPLICATIONS

This application is a divisional of U.S. patent application Ser. No. 11/779,837, filed on Jul. 18, 2007, the specification of which is incorporated herein by reference in its entirety.

This application is related to U.S. patent application Ser. No. 12/434067, filed same day herewith, the specification of which is incorporated herein by reference in its entirety.

BACKGROUND

Charging the battery of an electric vehicle is expensive, and if it is done improperly, charging can damage the battery. Systems and methods are needed to reduce the cost of battery charging while reducing battery damage.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The present subject matter provides systems and methods to charge a battery of a vehicle in a way that is adaptive to context. For example, in some parts of the world, electricity is less expensive during certain time periods. For example, electricity can be less expensive during nighttime, when less energy is being consumed due to lower air conditioning rates. This is an example time period, and others are possible.

The present subject matter provides users with the ability to select schedules to charge their vehicle in light of such varying rates. For examples, a user can charge their car to a regular capacity (e.g., 80 % of capacity) or a regular energy stored rate (percent of capacity needed to store a set amount of energy increases over time) during times when it is less expensive to purchase electricity. Users can optionally select to charge the car in excess of the regular amount, perhaps to augment available driving range, in certain examples. In some instances, a user can select to charge to a regular rate before they sleep, and can wake up and select to charge in addition to the regular range as they prepare for their day. These and other embodiments are discussed herein.

Figure 1:
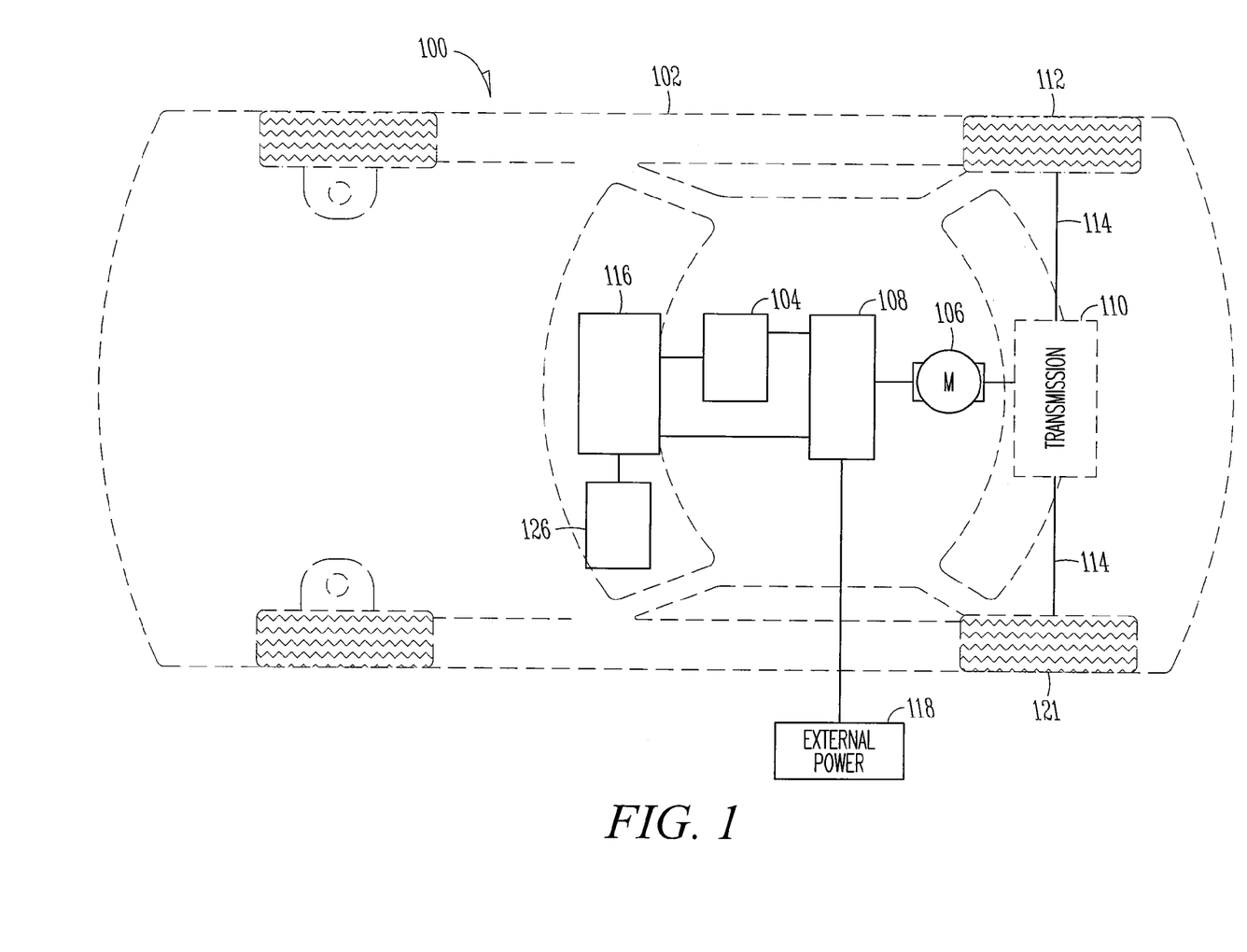
FIG. 1 is a high level diagram of an electric vehicle, according to one embodiment.

FIG. 1 shows a vehicle system 100, according to one embodiment of the present subject matter. In various embodiments, the vehicle 102 is an electric vehicle and includes a vehicle propulsion battery 104 and at least one propulsion motor 106 for converting battery energy into mechanical motion, such as rotary motion. The present subject matter includes examples in which the vehicle propulsion battery 104 is a subcomponent of an energy storage system ("ESS"). An ESS includes various components associated with transmitting energy to and from the vehicle propulsion battery 104 in various examples, including safety components, cooling components, heating components, rectifiers, etc. The inventors have contemplated several examples of ESSs and the present subject matter should not be construed to be limited to the configurations disclosed herein, as other configurations of a vehicle propulsion battery 104 and ancillary components are possible.

The battery includes one or more lithium ion cells in various examples. In some examples, the battery 104 includes a plurality of lithium ion cells coupled in parallel and/or series. Some examples include cylindrical lithium ion cells. In certain examples, the battery 104 includes one or more cells compatible with the 18650 battery standard, but the present subject matter is not so limited. Some examples include a first plurality of cells connected in parallel to define a first brick of cells, with a second plurality of cells connected in parallel to define a second brick of cells, with the first brick and the second brick connected in series. Some examples connect 69 cells in parallel to define a brick. Battery voltage, and as such, brick voltage, often ranges from around 3.6 volts to about 4.2 volts in use. In part because the voltage of batteries ranges from cell to cell, some instances include voltage management systems to maintain a steady voltage. Some embodiments connect 9 bricks in series to define a sheet. Such a sheet has around 35 volts. Some instances connect 11 sheets in series to define the battery of the ESS. The ESS will demonstrate around 385 volts in various examples. As such, some examples include approximately 6,831 cells which are interconnected.

Additionally illustrated is an energy converter 108. The energy converter 108 is part of a system which converts energy from the vehicle propulsion battery 104 into energy useable by the at least one propulsion motor 106. In certain instances, the energy flow is from the at least one propulsion motor 106 to the vehicle propulsion battery 104. As such, in some examples, the vehicle propulsion battery 104 transmits energy to the energy converter 108, which converts the energy into energy usable by the at least one propulsion motor 106 to propel the electric vehicle. In additional examples, the at least one propulsion motor 106 generates energy that is transmitted to the energy converter 108. In these examples, the energy converter 108 converts the energy into energy which can be stored in the vehicle propulsion battery 104. In certain examples, the energy converter 108 includes transistors. Some examples include one or more field effect transistors. Some examples include metal oxide semiconductor field effect transistors. Some examples include one more insulated gate bipolar transistors. As such, in various examples, the energy converter 108 includes a switch bank which is configured to receive a direct current ("DC") power signal from the vehicle propulsion battery 104 and to output a three-phase alternating current ("AC") signal to power the vehicle propulsion motor 106. In some examples, the energy converter 108 is configured to convert a three phase signal from the vehicle propulsion motor 106 to DC power to be stored in the vehicle propulsion battery 104. Some examples of the energy converter 108 convert energy from the vehicle propulsion battery 104 into energy usable by electrical loads other than the vehicle propulsion motor 106. Some of these examples switch energy from approximately 390 Volts to 14 Volts.

The propulsion motor 106 is a three phase alternating current ("AC") propulsion motor, in various examples. Some examples include a plurality of such motors. The present subject matter can optionally include a transmission or gearbox 110 in certain examples. While some examples include a 1-speed transmission, other examples are contemplated. Manually clutched transmissions are contemplated, as are those with hydraulic, electric, or electrohydraulic clutch actuation. Some examples employ a dual-clutch system that, during shifting, phases from one clutch coupled to a first gear to another coupled to a second gear. Rotary motion is transmitted from the transmission 110 to wheels 112 via one or more axles 114, in various examples.

A vehicle management system 116 is optionally provided which provides control for one or more of the vehicle propulsion battery 104 and the energy converter 108. In certain examples, the vehicle management system 116 is coupled to vehicle system which monitors a safety system (such as a crash sensor). In some examples the vehicle management system 116 is coupled to one or more driver inputs (e.g., an accelerator). The vehicle management system 116 is configured to control power to one or more of the vehicle propulsion battery 104 and the energy converter 108, in various embodiments.

External power 118 is provided to communicate energy with the vehicle propulsion battery 104, in various examples. In various embodiments, external power 118 includes a charging station that is coupled to a municipal power grid. In certain examples, the charging station converts power from a 110V AC power source into power storable by the vehicle propulsion battery 104. In additional examples, the charging station converts power from a 120V AC power source into power storable by the vehicle propulsion battery 104. Some embodiments include converting energy from the battery 104 into power usable by a municipal grid. The present subject matter is not limited to examples in which a converter for converting energy from an external source to energy usable by the vehicle 100 is located outside the vehicle 100, and other examples are contemplated.

Some examples include a vehicle display system 126. The vehicle display system 126 includes a visual indicator of system 100 information in some examples. In some embodiments, the vehicle display system 126 includes a monitor that includes information related to system 100. Some instances include one or more lights. Some examples include one or more lights, and the vehicle display system 126 in these embodiments includes the illumination and brightness of these lights. The vehicle management system, in certain embodiments, coordinates the function of a charge state circuit 106, and the charging coupler port 108, as pictured in FIG. 1. In certain instances, the charge state circuit 106, and the charging coupler port 108 are part of the vehicle management system 116. In some of these instances, the lighting circuit 114 is part of the vehicle display system 126. In certain examples, the illuminated indicator 116 of FIG. 1 is part of the vehicle display system 126.

Figure 2:
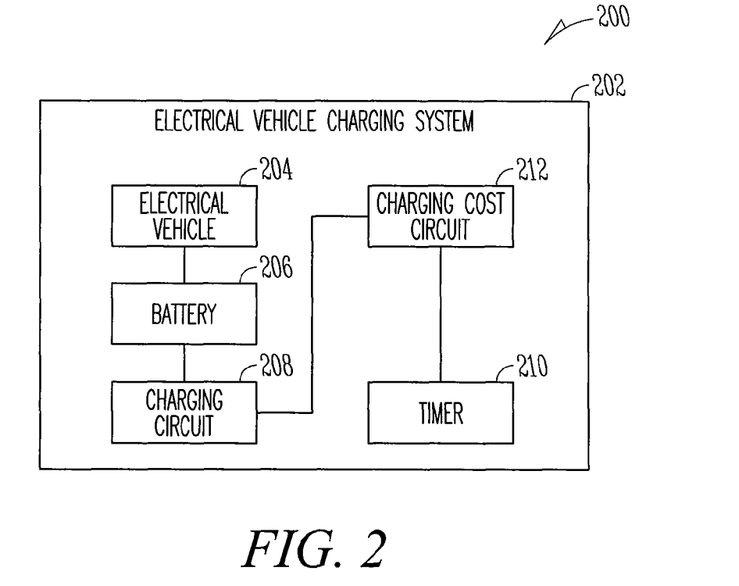
FIG. 2 is a diagram of an electrical vehicle charging system, according to one embodiment.

FIG. 2 is a diagram of an electrical vehicle charging system 202, according to one embodiment. In various embodiments, the system includes an electric vehicle 204 and a battery 206 coupled to the electric vehicle to the electric vehicle 204 to propel the electric vehicle 204. Electric vehicles contemplated by the present subject matter include ground based vehicles, as well as aircraft and aquatic vehicles.

The illustration includes a charging circuit 208 to charge the battery 206. This can include an external charging station that converts power from a municipal power grid to power that can be stored in battery 206. This can additionally include charging converter onboard the electric vehicle that can take energy from a generally available outlet of a municipal power grid (such as a National Electrical Manufacturers Association 5-15 outlet) and convert it to power storable in the battery 206. Other configurations are possible.

Various examples include a charging cost circuit 212 to estimate a charging cost rate. In various embodiments, a charging cost rate is the instantaneous cost of energy transfer. Cost rate is in cost per energy transferred over time (e.g., $0.06 United States Dollars per kilowatt hour). The present subject matter is compatible with various ways of measuring how much energy is consumed and how quickly it is being consumed.

In various examples, the charging cost circuit 212 can control the charging circuit 208 and turn it on or off. In various embodiments, this includes interrupting a conductive path to the charging circuit 208, such as by opening a switch. In additional instances, this includes communicating a charging state signal indicative of whether the charging circuit 208 should be active or inactive. For example, in certain examples, a field effect transistor switches activation power to the charging circuit 208, and the charging cost circuit 212 controls the gate for the field effect transistor.

In some embodiments, the charging cost circuit 212 is part of a computer onboard a vehicle (e.g., the vehicle management system 116 of FIG. 1). In additional examples, the charging cost circuit 212 is part of a computer in a home or workplace that at least partially controls how the electric vehicle 204 is charged. Various embodiments include a timer circuit to provide a time signal to the charging cost circuit. The timer 210 can be integrated with an electronics module, such as an assembly including a printed circuit board, the timer, and the charging cost circuit.

In various examples, the charging cost circuit 212 is to turn on the charging circuit 208 during a first time period in which the charging cost rate is below a first threshold. In certain instances, the charging circuit 208 is turned on until the battery reaches a first energy stored level (e.g., a specified amp-hours amount, coulomb amount, etc.). In some optional embodiments, the charging cost circuit 212 turns on the charging circuit 208 during a second time period in which the charging cost rate is above the first threshold. This might be during the morning, after a power supplier has switched to a higher cost rate, but before a user begins to drive their electric vehicle.

In various examples, the system includes a cost estimator circuit to calculate total charging cost during the first period and the second period. For example, this circuit can estimate that it will cost $5.00 to charge an electric vehicle based on measured conditions and optionally learned conditions. In certain examples, an electric vehicle charging system monitors energy use patterns to estimate total charging cost. In additional embodiments, an electric vehicle charging system cross references measured variables (such as voltage, temperature, and the like) with known values to estimate total charging cost. Some of these examples include a trend circuit to record a plurality of charging stop times over a period of days, and to predict a predicted charging stop time based on the plurality of charging stop times. A charging stop time, in various embodiments, is the time of day when a user usually unplugs their electric vehicle. In many cases, this is right before the user engages their electric vehicle for a drive.

In some examples, the charging cost circuit 212 automatically selects the length of the second time period to achieve a reduced charging cost that is less than a total charging cost. For example, if an electric vehicle charging system estimates a total charging cost as set out above, it can monitor charging cost rates and adjust time spent charging during a less expensive rate and time spent charging during a more expensive rate, such that the day's predicted cost of charging is less than the total charging cost that was estimated.

If desired, certain embodiments include a user controllable interface connected to the charging cost circuit 212 such that the user can input a threshold for what is a less expensive charging cost rate and what is a more expensive charging cost rate. For example, in certain embodiments, a user could specify to charge only when below a certain threshold by interacting with a computer (e.g., a vehicle computer or a home computer).

In some examples, the present system is also aware of how calendar life is being impacted by charging behaviors. This can be studied using monitored variables (e.g., by performing a load test) or by monitoring charging behavior over time (e.g., counting the number of cycles and monitoring cycle parameters such as current rate and time duration). The system can prioritize whether charging is selected to improve calendar life or reduce cost. For example, some instance charge a battery to a regular energy stored level, such as 80% of full stored energy, preferentially to improve calendar life, as certain battery chemistries, such as lithium ion, last longer if they are charged as such. Some examples will not charge above a regular energy stored level unless instructed to. Instruction can be in the form of an indicator, such as a signal from a computer that automatically provides the signal based on an analysis, or it can be provided based on a manual interaction with a user. For example, an electric vehicle can be adjusted so that it is always in "regular mode" in which it charges to 80% of full stored energy for most of its life, and is only charged to "boost mode" (e.g., 90% of full stored energy level) when a user or other source instructs it to do so.

As such, in certain examples, the charging cost circuit 212 is to turn on the charging circuit until the battery reaches a second energy stored level. The second energy stored level can be between a first energy stored level and a full energy stored level, or it can be at a full energy stored level. The present subject matter includes embodiments in that a charge is held at the second energy stored level for a period of time. For instance, if a first time period is specified in which a first energy stored level can be reached, and a second time period is specified in which a second energy stored level can be reached, the present system can reach the first energy stored level and pause until it enters the second time period, and then charge until the second energy stored level is reached. If the second energy stored level is reached before expiration of the second time period, the present system can maintain the second energy stored level. A user controllable interface is included in some examples and is connected to the charging cost circuit 212 such that the user can input length of the second period during which charging takes place.

Hardware and Operating Environment

This section provides an overview of example hardware and the operating environments in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
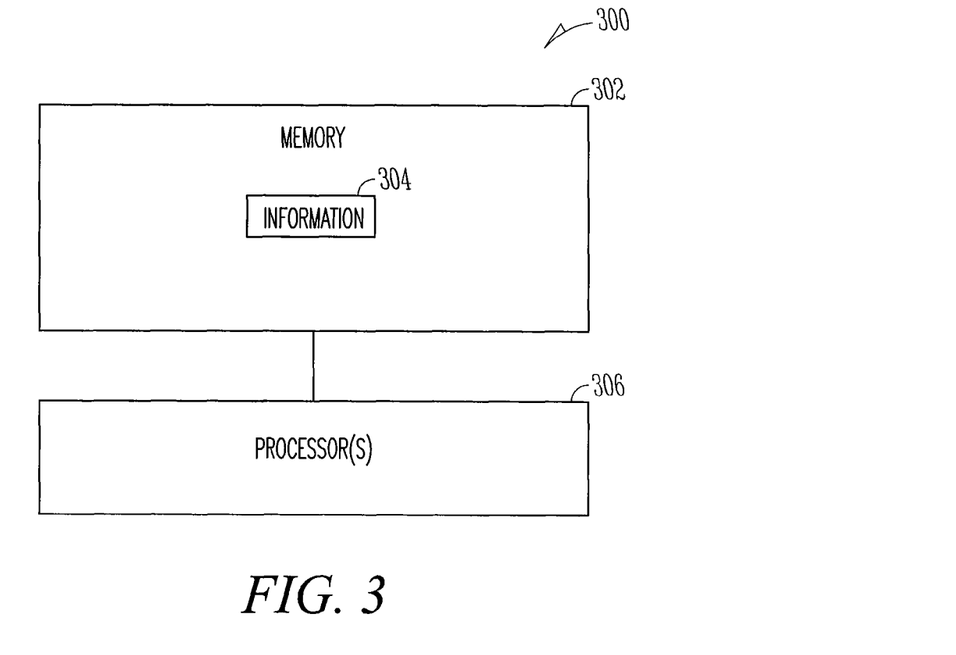
FIG. 3 is a block diagram of an article according to various embodiments of the invention.

FIG. 3 is a block diagram of an article 300 according to various embodiments of the present subject matter. Such embodiments may comprise a computer, a memory system, a magnetic or optical disk, certain other storage device, or any type of electronic device or system. The article 300 may include one or more processor(s) 306 coupled to a machine-accessible medium such as a memory 302 (e.g., a memory including electrical, optical, or electromagnetic elements). The medium may contain associated information 304 (e.g., computer program instructions, data, or both) which, when accessed, results in a machine (e.g., the processor(s) 306) performing the activities described herein.

Methods

Various methods disclosed herein provide for battery charging based on cost and life. As mentioned above, certain examples charge batteries with electricity derived from a municipal power grid. In some instances, this electricity is less expensive during certain times of the day. In particular, many parts of the world offer less expensive energy during evening times. The present subject matter provides methods that can automatically charge a vehicle in consideration of such less expensive charging cost rates. The present subject matter, however, is also functional under a manual operation scheme, in which a person is able to select an amount of energy to receive during a first period of time (e.g., a period of time when electricity is less expensive), and during a first period of time (e.g., a period of time when electricity is more expensive).

Figure 4:
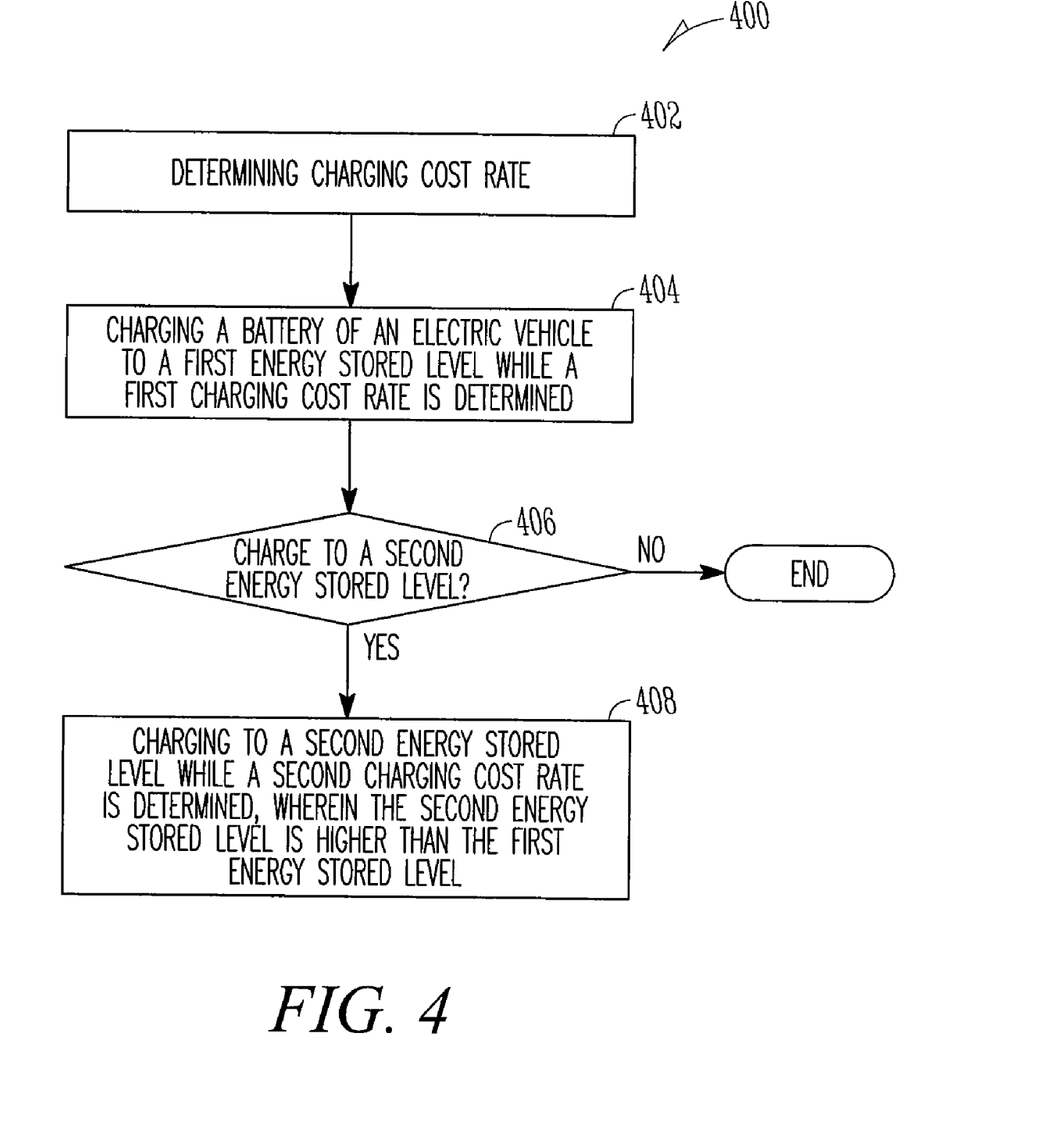
FIG. 4 is a method of charging a battery, according to one embodiment of the present subject matter.

FIG. 4 is a method of charging a battery, according to one embodiment of the present subject matter. At 402, the method includes determining charging cost rate. At 404, the method includes charging a battery of an electric vehicle to a first energy stored level while a first charging cost rate is determined. At 406, a decision is made: should the system charge to a second energy stored level? If yes, at 408, the system charges the battery to a second energy stored level while a second charging cost rate is determined that is higher than the first energy stored level. If no, the method ends. Various optional features are combinable with the present methods. For example, in certain optional methods, the first charging cost rate is lower than the second charging cost rate. But some methods are contemplated in which the first charging cost rate is higher than the second charging cost rate.

Various options are contemplated. As stated elsewhere, examples in which a system does not charge fully, but will charge more fully when instructed to, are contemplated. In certain embodiments, if a user plugs in their electric vehicle at night, it will charge to a first energy stored level and pause at that level. In some embodiments that level is 80% of capacity, but the present subject matter is not so limited. In certain examples, unless the user instructs the electric vehicle to charge even more, the vehicle will not charge more. In certain instances, a push button is provided in an electric vehicle charging system that enables a user to instruct the system to add more charge. Such a push button could be operated in the morning, in some instances, shortly before a user realizes they should use their car to drive longer distances before recharging than normal.

In some embodiments, a system is provided that is able to store a battery at a energy stored level that improves calendar life. In certain examples, this energy stored level is 50% of capacity. This energy stored level can be monitored over time and maintained. The stored energy level maintenance mode is entered into upon a user input, in some examples. In additional embodiments, a vehicle realizes that it has been dormant for a period of time that exceeds a threshold, and enters a storage mode. Various examples recognize dormancy in other ways, such as by monitoring the odometer or reading other instruments. Storage mode can be indicated by a horn sound or with another indicator, such as a flashing light.

Figure 5:
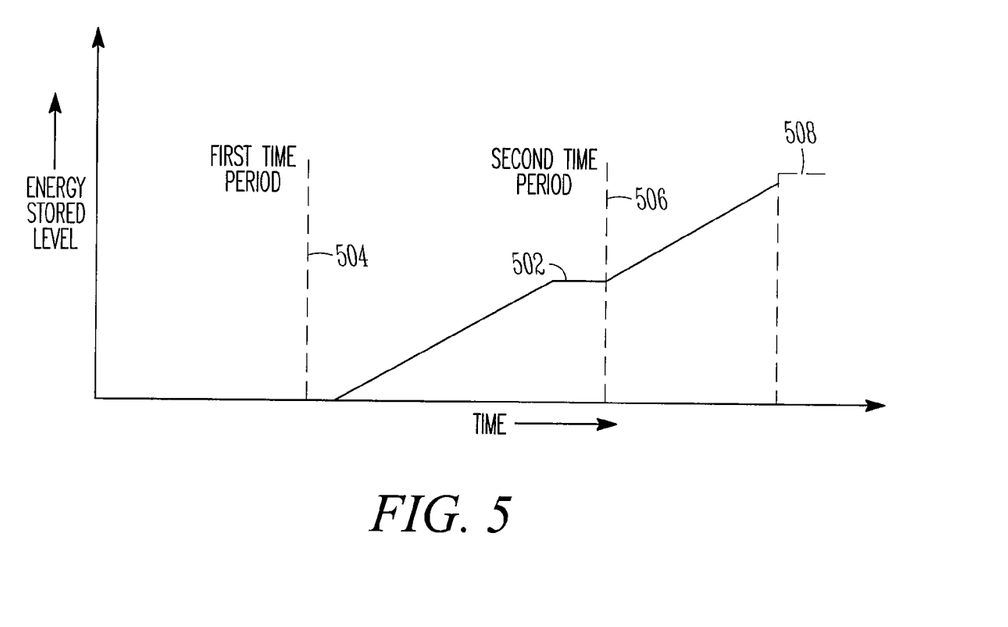
FIG. 5 is a method of charging a battery to a first energy stored level during a first time period and charging the battery during a second time period, according to one embodiment of the present subject matter.

FIG. 5 is a method of charging a battery to a first energy stored level during a first time period 504 and charging the battery during a second time period 506, according to one embodiment of the present subject matter. Illustrated is an example in which a battery is charged until the first energy stored level 502 is reached. In various embodiments, this charging is limited to a first time period 504. In various examples, the first time period is coincident with the time of day in which a first charging cost rate is within in a first cost range.

Additional embodiments charge the battery until the second energy stored level 508 is reached. In various examples, this occurs during a second time period 506. In certain instances, the second time period 506 is user selected. In some embodiments, the second time period 506 is coincident with a period of time in which a charging cost rate fits into a second cost range that is different from a first cost range. In certain examples, the second energy stored level 508 is less than a full energy stored level. The illustrated embodiment shows that the electric vehicle was unplugged shortly before it reached the second energy stored level 508. This may be exhibited in examples in which a user decides to leave before the second time period ends.

Figure 6:
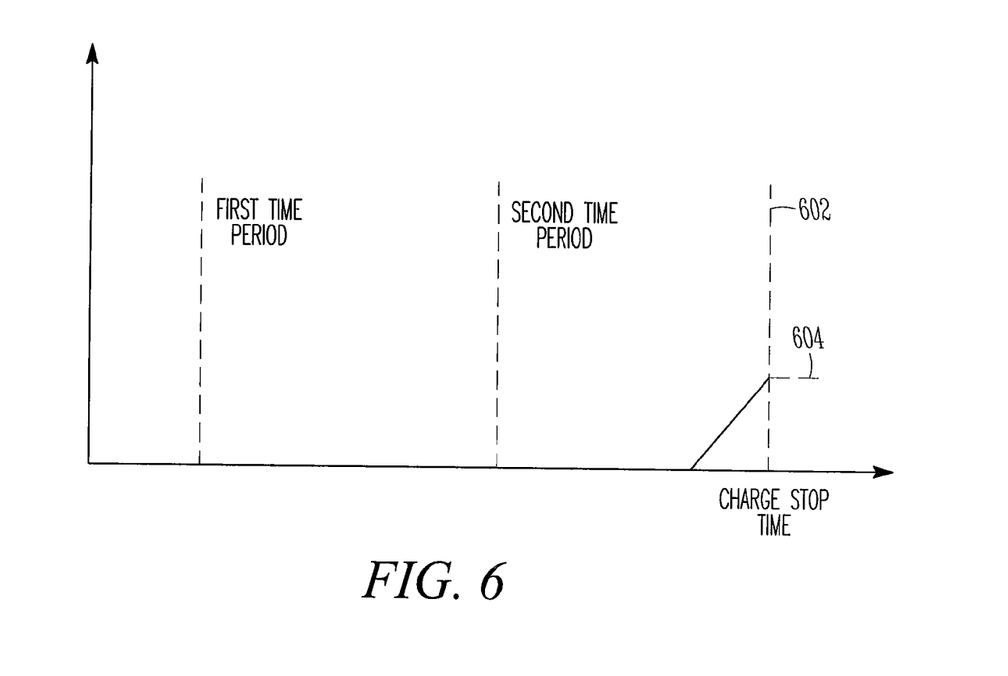
FIG. 6 is a method of charging a battery during a second time period, according to one embodiment of the present subject matter.

FIG. 6 is a method of charging a battery during a second time period, according to one embodiment of the present subject matter. Embodiments of the present subject matter include charging the battery to the second energy stored level only if so instructed by a stored indicator, as discussed above.

Some examples include predicting a daily charge stop time 602 based on an energy usage pattern. Some instances prompt a user to select between improved calendar life and reduced cost. Embodiments that prompt a user for information include storing a user response as the stored indicator. In various examples, if the stored indicator indicates improved calendar life, the method charges to the second energy level by delaying charging to the second energy level until charging can occur constantly up to the predicted daily charge stop time such that the second energy stored level is reached. The present illustration shows that the battery of an electric vehicle was already charged near a regular stored charge, and elected to not charge the battery during the first time period. The electric vehicle charging system additionally recognized a charge stop time, and commenced charging such that it could reach the second energy stored level 604 at the charge stop time 602. Such a system can improve calendar life of a battery. Various embodiments include electing to not charge to the second energy stored level.

Figure 7:
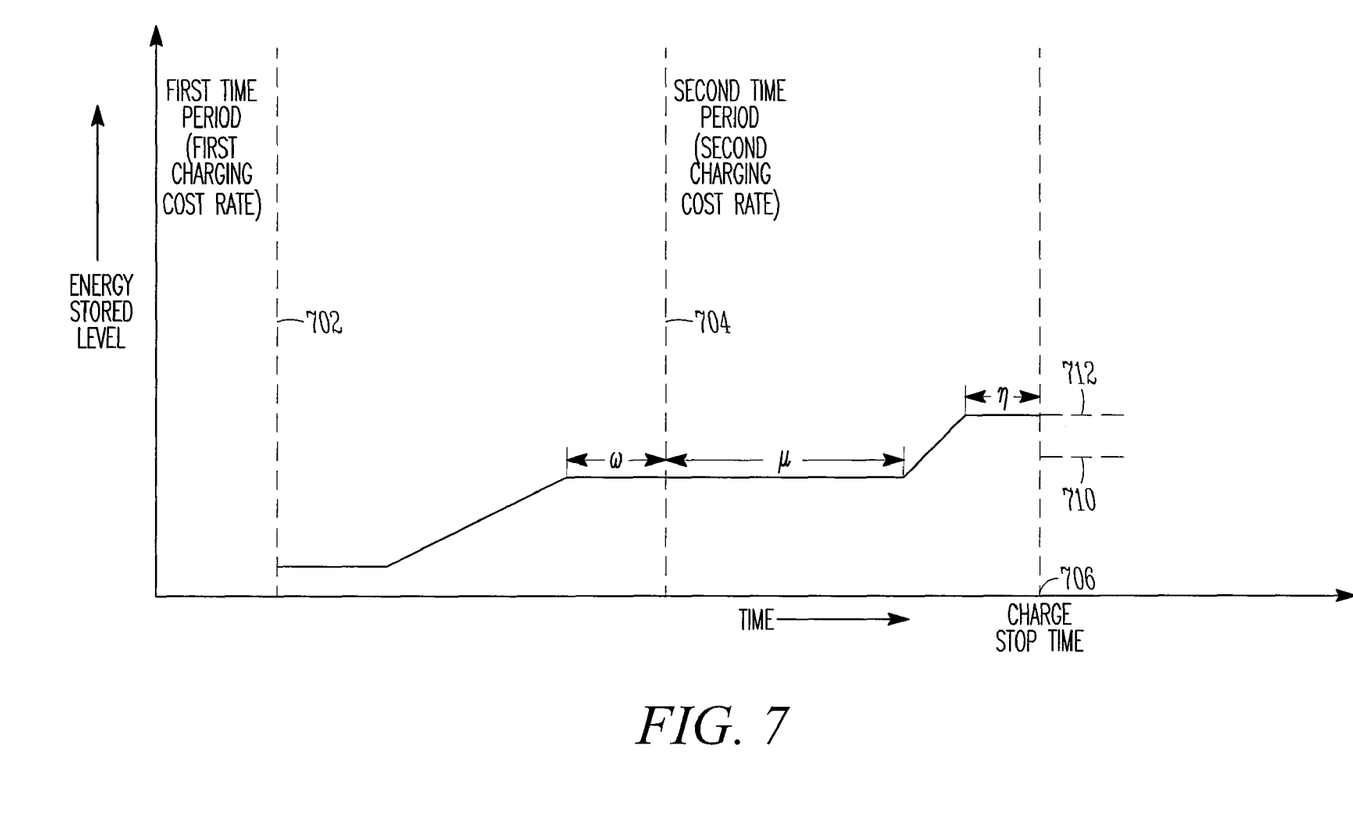
FIG. 7 is a method of charging to a first energy stored level during a first time period, and to a second energy stored level during a second time period, according to one embodiment of the present subject matter.

FIG. 7 is a method of charging to a first energy stored 710 level during a first time period, and to a second energy stored 712 level during a second time period, according to one embodiment of the present subject matter. Various embodiments include charging the battery according to a charging schedule that includes a first time period 702 and a second time period 704, the first energy stored level 710 reached (during the $\omega$ time period) within the first time period 702, the second energy stored level 712 (during the $\eta$ time period) reached during the second time period 704.

Some examples include predicting a daily cost based on an energy usage pattern. Some instances adjust the length of the first time period and length of the second time period such that a total cost of charging to the second energy stored level is less than the predicted daily cost.

Some examples include predicting a daily charge stop time 706 based on an energy usage pattern. Some of these examples include delaying (during the $\mu$ time period) charging to the second energy level until charging can occur constantly up to the predicted daily charge stop time 706. In some instances, this occurs such that the second energy stored level 712 is reached. Embodiments are included in which no charging occurs during at least a portion of the second time period 704.

Figure 8:
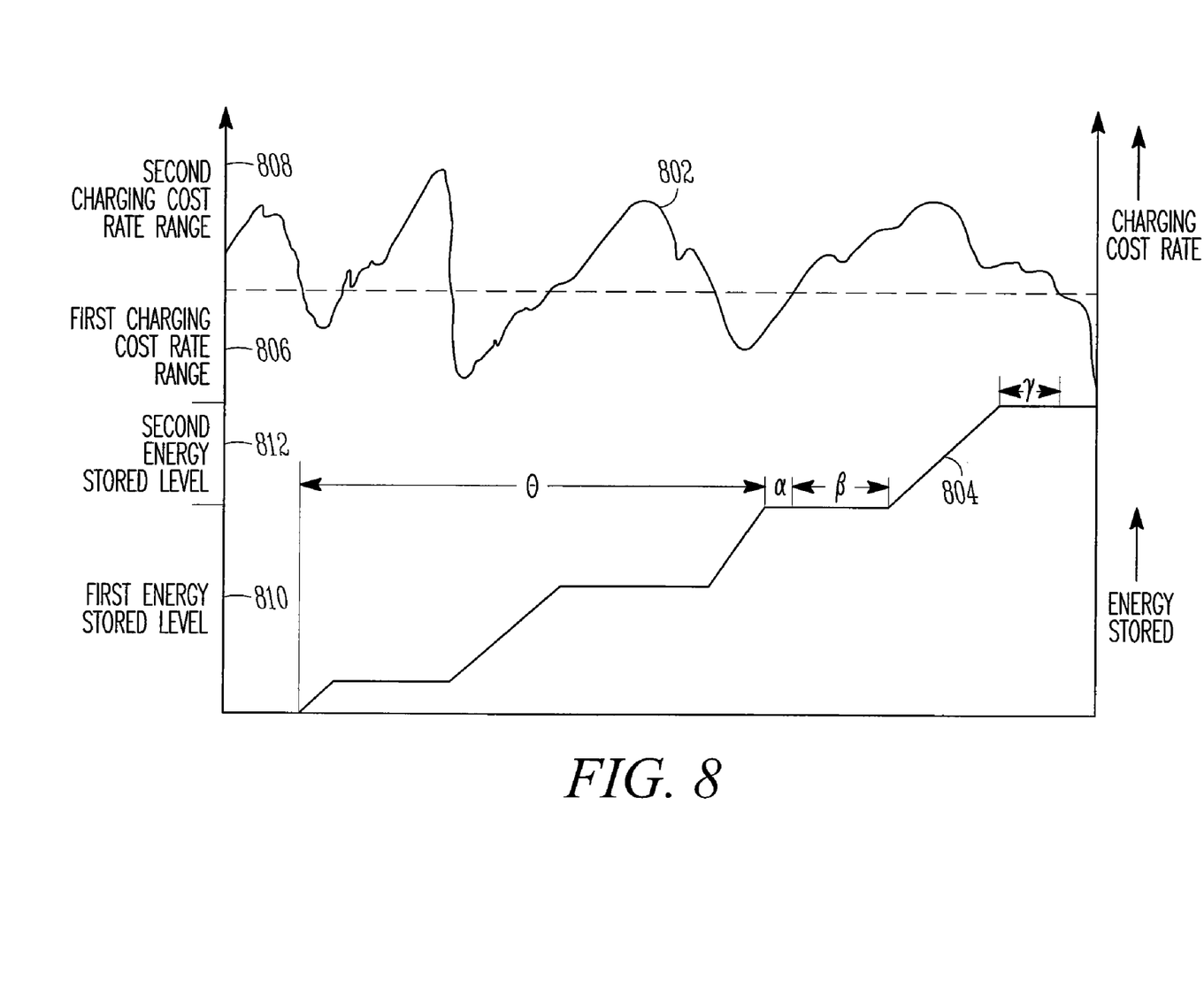
FIG. 8 is a method of charging a battery in the context of a charging rate that varies up and down throughout the day, according to one embodiment of the present subject matter.

FIG. 8 is a method of charging a battery in the context of a charging rate that varies up and down throughout the day, according to one embodiment of the present subject matter. A charge rate 802 is determined and varies. A battery energy stored level 804 is charted in the illustration. In various embodiments, if the charging rate is at a first charge cost rate 806, the battery charges on its way to a first energy stored level 810. If the system reaches this level, it stops charging if it is during the first time period. For example, a first time period, defined by the addition of time periods $\theta$, $\alpha$, and $\beta$ is illustrated. During this time, the system charges only when the charging cost rate is within the first charging cost rate range 806. Starting after time period $\beta$, the illustration enters a second time period in which it is acceptable to charge as the second charging cost rate range 808. The illustration reaches a second stored energy level 812, and does not add more charge during the $\gamma$ time period, during that the second charging cost rate is realized, nor after that time period, during which the first charging cost rate is realized.

Such a system could be helpful in areas in which municipal power grid pricing fluctuates frequently, such as in areas where wind turbines produce excess power at windy times, and a shortage of power during times in which it is not windy. Various examples include receiving a cost signal and charging at one of the first charging cost rate and the second charging cost rate in response to that cost signal.

Figure 9:
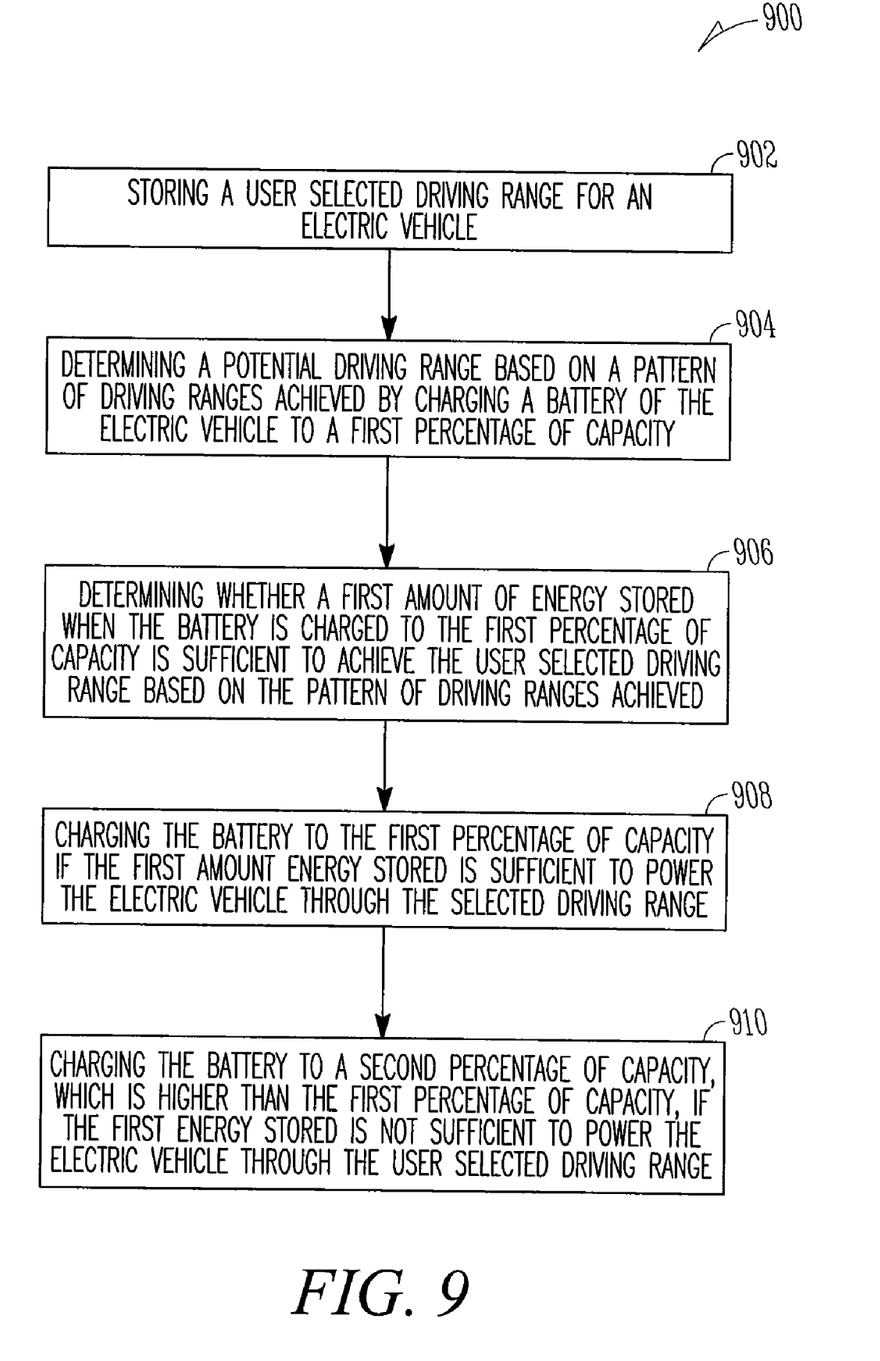
FIG. 9 is a method according to one embodiment of the present subject matter.

FIG. 9 is a method according to one embodiment of the present subject matter. At 902, the method includes storing a user selected driving range for an electric vehicle. At 904, the method includes determining a potential driving range based on a pattern of driving ranges achieved by charging a battery of the electric vehicle to a first percentage of capacity. At 906, the method includes determining whether a first amount of energy stored when the battery is charged to the first percentage of capacity is sufficient to achieve the user selected driving range based on the pattern of driving ranges achieved. At 908, the method includes charging the battery to the first percentage of capacity if the first amount energy stored is sufficient to power the electric vehicle through the selected driving range. At 910, the method includes charging the battery to a second percentage of capacity, which is higher than the first percentage of capacity, if the first energy stored is not sufficient to power the electric vehicle through the user selected driving range. In certain examples, the second energy stored level is 100%.

Figure 10:
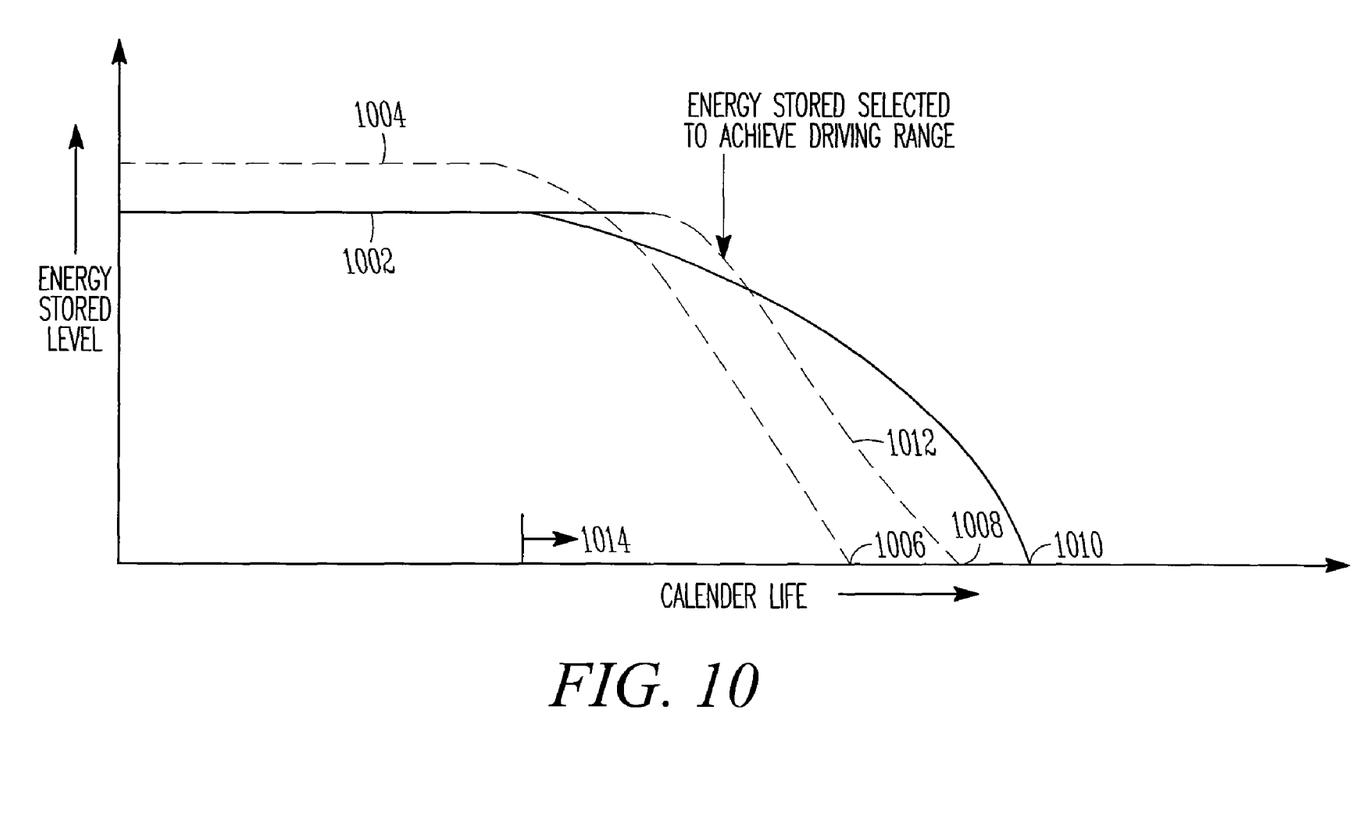
FIG. 10 is a method of charging a battery to achieve a selected range, according to one embodiment of the present subject matter.

FIG. 10 is a method of charging a battery to achieve a selected range, according to one embodiment of the present subject matter. A life cycle of a battery always charged to a regular capacity 1002 is illustrated, with a regular end of life 1010. This is the energy stored when the battery is charged to a specific capacity, such as 80%, that is less than full capacity. Additionally illustrated is a life cycle of a battery always charged to a full capacity 1004, with a full end of life 1006. A hybrid curve 1012 is illustrated for a battery which is at first charged to a regular capacity, and then to a capacity that is more than the regular capacity, demonstrating a hybrid end of life 1008. In the illustration, the hybrid begins to charge a battery at a capacity higher than a regular capacity starting at a certain time 1014, although the present subject matter is not so limited. The time hybrid starts to charge to a capacity in excess of the regular capacity commences can coincide with the time that energy stored when charged to regular capacity starts to diminish. The penalty for charging the hybrid higher than the regular capacity is an earlier end of life 1008 than the end of life 1010 enjoyed by batteries always charged to regular capacity. Battery capacity has a linear relationship with voltage in some examples, and certain instances charge to respective voltages in certain examples.

The hybrid curve assists in a user to consistently maintain a usable driving range. For example, if energy stored for a certain capacity starts to diminish, as it does for the regular capacity curve 1002 after a certain time 1014, driving range for that capacity also diminishes. But some users desire to avoid diminished range. As such, the present subject matter charges to a higher capacity, following the hybrid curve 1012. This provides a compromise between enjoying some time during which a longer range is realized, and shortening the end of life of the battery.

Various examples of the present subject matter automatically track decreasing range based on an energy use pattern. Some of these embodiments switch to a hybrid curve automatically, so a user does not realize range is decreasing. In some embodiments, switching to the hybrid curve occurs only if the end of life is predicted to occur within the warranty period of an electric vehicle. Some embodiments provide an alert to a user than charging to a hybrid capacity has begun. In some instances the hybrid curve includes a series of incremental upward adjustments to capacity. In some embodiments, capacity is increased by 0.05 % a day. Other increases are contemplated.

In some embodiments, a vehicle system drives a first range during some driving sessions and a second range during additional driving sessions, and a user selects which range to drive. In some of these embodiments, a vehicle charging system automatically selects which of the regular capacity and the hybrid capacity to use depending on the user selected range.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A battery charging system, comprising:
   a battery;
   an electric vehicle, the battery coupled to a propulsion motor configured to propel the electric vehicle;
   a charging circuit to charge the battery;
   a charging cost circuit, wherein said charging cost circuit controls operation of said charging circuit; and
   a timer circuit coupled to said charging cost circuit, wherein said timer circuit provides a plurality of timing signals to said charging cost circuit, said plurality of timing signals corresponding to at least a first time period and a second time period, wherein said second time period follows said first time period, and wherein the charging cost circuit turns on the charging circuit during said first time period in which the charging cost rate is below a first threshold and continues operation of said charging circuit until the battery reaches a first energy stored level, wherein the charging cost circuit terminates the charging circuit operation during said first time period only after said first energy stored level is reached, wherein the charging cost circuit pauses operation of said charging circuit whenever said charging cost rate is above the first threshold, and wherein the charging cost circuit turns on the charging circuit during said second time period in which the charging cost rate is above the first threshold and continues operation of said charging circuit until the battery reaches a second energy stored level or a user disrupts said charging circuit, wherein said second energy stored level is greater than said first energy stored level.

2. The battery charging system of claim 1, further comprising a trend circuit to record a plurality of charging stop times over a period of days, and to predict a predicted charging stop time based on the plurality of charging stop times, wherein the charging cost circuit automatically selects a charging circuit initiation time within said second time period to achieve said second energy stored level prior to reaching said predicted charging stop time.

3. The battery charging system of claim 1, further comprising a user controllable interface connected to the charging cost circuit such that the user can input the first threshold.

4. The battery charging system of claim 1, further comprising a user controllable interface connected to the charging cost circuit such that the user can input a charging stop time, wherein the charging cost circuit automatically selects a charging circuit initiation time within said second time period to achieve said second energy stored level prior to reaching said predicted charging stop time.

5. The battery charging system of claim 1, wherein the second energy stored level is less than a full energy stored level.

6. The battery charging system of claim 1, further comprising a user controllable interface connected to the charging cost circuit such that the user can input a charging circuit initiation time within said second time period.

7. The battery charging system of claim 1, further comprising a user controllable interface connected to the charging cost circuit such that the user can input a length of the first time period.

8. The battery charging system of claim 1, wherein the first energy stored level is 80% of full stored energy.

9. The battery charging system of claim 1, wherein the second energy stored level is 90% of full stored energy.

10. The battery charging system of claim 1, wherein the charging cost circuit receives a municipal charging cost rate from a power network and estimates the charging cost rate based on the municipal charging cost rate.

11. A method of charging a battery within an electric vehicle utilizing a battery charging system, the method comprising the steps of:
    estimating cost rates for at least a first time period and a second time period, wherein said first time period precedes said second time period, wherein an estimated cost rate for said first time period is less than said estimated cost rate for said second time period, and wherein a charging stop time is anticipated to occur within said second time period;
    initiating battery charging within said first time period;
    pausing battery charging within said first time period whenever a measured cost rate exceeds said estimated cost rate for said first time period;
    terminating battery charging within said first time period only after said battery reaches a first state of charge;
    initiating battery charging within said second time period; and
    terminating battery charging within said second time period after said battery reaches a second state of charge, wherein said second state of charge is greater than said first state of charge.

12. The method of claim 11, further comprising the step of decoupling said electric vehicle from a battery charging power source during said second time period.

13. The method of claim 12, wherein said decoupling step causes said charging stop time to be reached.

14. The method of claim 12, wherein said decoupling step occurs prior to said battery reaching said second state of charge.

15. The method of claim 11, further comprising the step of programming said charging stop time within said battery charging system.

16. The method of claim 15, further comprising the step of determining a start time for performing said step of initiating battery charging within said second time period, wherein said start time is selected to allow said second state of charge to be reached prior to occurrence of said charging stop time.

17. The method of claim 11, further comprising the steps of:
    monitoring a daily charging system termination time; and
    estimating said charging stop time based on results of said monitoring step.

18. The method of claim 17, further comprising the step of determining a start time for performing said step of initiating battery charging within said second time period, wherein said start time is selected to allow said second state of charge to be reached prior to occurrence of said charging stop time.

19. The method of claim 11, further comprising the step of setting said first state of charge to 80% of full state of charge.

20. The method of claim 11, further comprising the step of setting said second state of charge to 90% of full state of charge.

21. The method of claim 11, further comprising the step of obtaining a municipal charging cost rate from a power network, wherein said obtaining step is performed by said battery charging system.

22. The method of claim 11, further comprising the step of determining a start time for performing said step of initiating battery charging within said second time period, wherein said start time is selected to allow said second state of charge to be reached prior to occurrence of said charging stop time.

23. The method of claim 11, further comprising the steps of inputting said first time period, said second time period, and said estimated cost rates for said first and second time periods.

24. The method of claim 11, further comprising the step of overriding said battery charging system to prevent performance of said step of initiating battery charging within said second time period.

* * * * *